United States Patent

[11] 3,617,379

| [72] | Inventors | William W. Ulmer;<br>Wesley W. Pendleton, both of Muskegon, Mich. |
|---|---|---|
| [21] | Appl. No. | 750,240 |
| [22] | Filed | Aug. 5, 1968 |
| [45] | Patented | Nov. 2, 1971 |
| [73] | Assignee | Annaconda Wire and Cable Company<br>Continuation-in-part of application Ser. No. 681,198, Nov. 7, 1967. |

[54] ELECTRICAL INSULATION COATING CONTAINING PARTICLES OF INORGANIC SUBSTANCE OF DIELECTRIC CONSTANT NO LESS THAN 1500
4 Claims, 3 Drawing Figs.

[52] U.S. Cl. .................................................... 117/224,
117/17, 117/21, 117/232
[51] Int. Cl. ........................................................ H01b 3/30
[50] Field of Search ............................................. 117/17, 21,
128.4, 224, 232, DIG. 6; 252/521; 260/37

[56] References Cited
UNITED STATES PATENTS

| 2,619,443 | 11/1952 | Robinson | 117/224 |
| 3,039,987 | 6/1962 | Elbling | 117/21 |
| 3,136,650 | 6/1964 | Avila | 117/21 |
| 3,242,131 | 3/1966 | Peerman | 117/21 |

Primary Examiner—William D. Martin
Assistant Examiner—Raymond M. Speer
Attorney—Victor F. Volk ABSTRACT: Very fine particles of ferrite or other high-dielectric-constant substances are dispersed in a coating resin before it is solidified and powdered for electrostatic deposition.

PATENTED NOV 2 1971  3,617,379
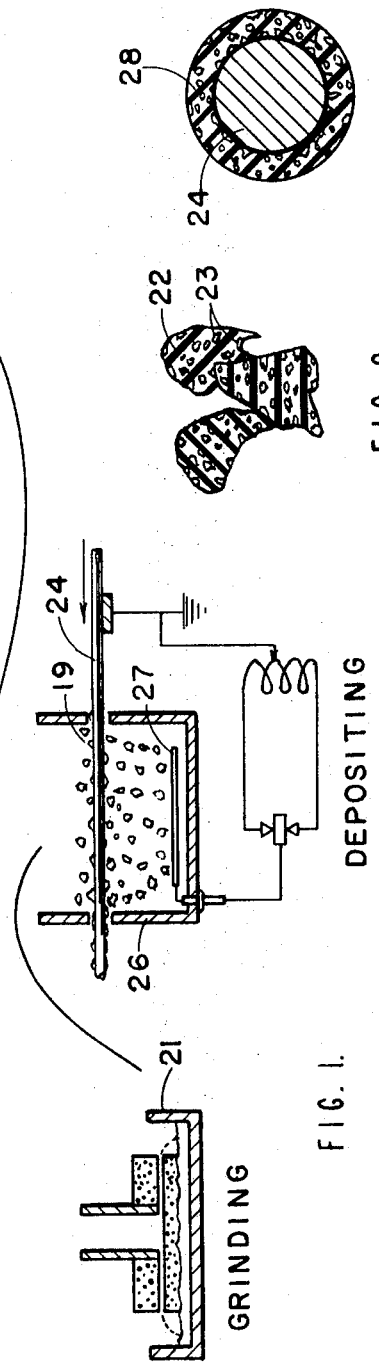
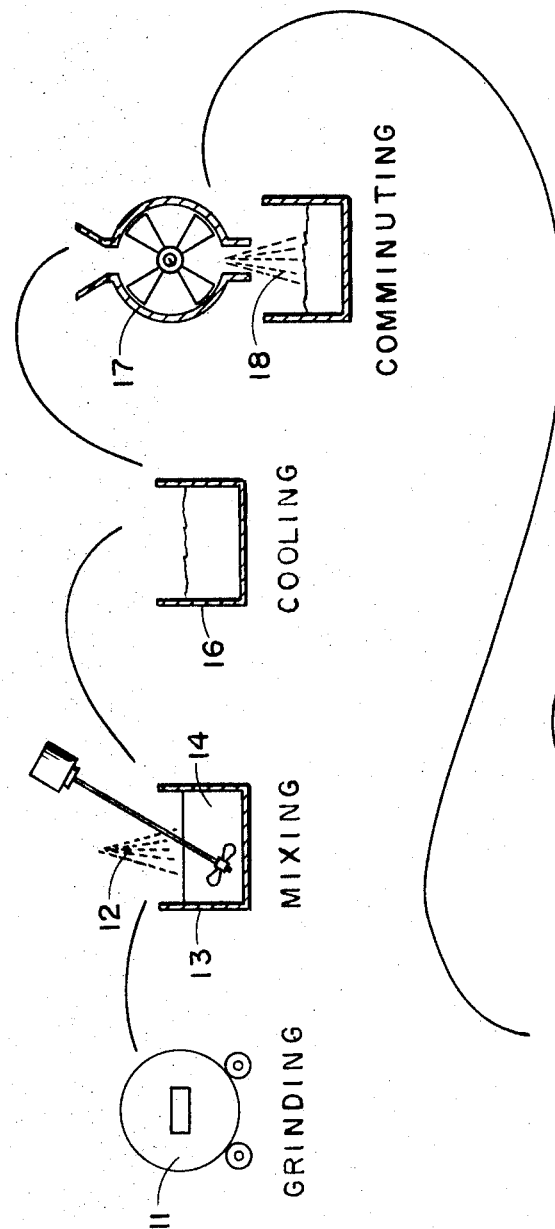
INVENTORS
W.W. ULMER and
W.W. PENDLETON
BY
V. F. Vock
THEIR AGENT

ELECTRICAL INSULATION COATING CONTAINING PARTICLES OF INORGANIC SUBSTANCE OF DIELECTRIC CONSTANT NO LESS THAN 1500

CROSS-REFERENCE TO RELATED APPLICATION

This application is a continuation-in-part of application Ser. No. 681,198 filed Nov. 7, 1967.

BACKGROUND OF THE INVENTION

This invention relates to the electrostatic deposition of powdered coatings such as magnet wire enamels. In electrostatic deposition the powder particles are electrified at high voltage and deposited upon a grounded surface which is subsequently heated to fuse the powder layer into a continuous coating. In our application Ser. No. 681,198 filed Nov. 7, 1967 it has been suggested to mix with the enamel powder a small percentage of finely pulverized material, such as barium titanate, that has a very high dielectric constant. It is believed that the fine barium titanate particles, in migrating toward the electrode on which a deposit is being formed, come in contact with the resinous particles and increase their velocity. While this method is useful it has the disadvantage that the high-dielectric-constant particles are deposited preferentially with the result that the stock of powder eventually becomes depleted of barium titanate and must be replaced. Since the density of the high-dielectric-constant material is generally higher than the density of the resinous enamel there is a likelihood, over periods of long storage of a mixture, particularly if it is frequently moved or subjected to vibration, of the high-dielectric strength material sifting to the bottom. Precision dry blending of the two powders is relatively costly and time consuming and adds significantly to the cost of the coating process.

SUMMARY

We have now found a method that in some important respects has advantages for forming an electrostatic powder in that the two types of particles cannot separate and mixing to a high degree of uniformity is inexpensive and rapid. Our method of forming a deposition of powder comprises the steps of dispersing particles of a substance that has a high dielectric constant within a dielectric liquid, solidifying the liquid and thus forming a solid dielectric with the particles distributed in it. We then comminute the solid dielectric to form the powder and deposit the powder electrostatically. In the case of a polymerized resin, in order to disperse particles at low viscosity, the polymerization may be accomplished after the particles are mixed in.

We have invented a powder suitable for electrostatic deposition that comprises first particles of organic resinous composition, second particles much finer than the first particles fused within the first particles. The second particles are inorganic and have a dielectric constant of at least 1,500. They are suspended rather than dissolved in the first particles. The first particles may advantageously comprise a magnet wire enamel resin such, for example, as an epoxy resin and the second particles may for preferred examples, comprise barium titanate or a ferrite.

An electrically insulated article of our invention will comprise a metallic conductor and a layer of insulation coating the conductor. The insulation comprises the fusion of a large plurality of particles of polymeric powder, such as epoxy powder, electrostatically deposited on the conductor and each comprising a plurality of finer particles of an inorganic substance of high dielectric constant such, for example, as barium titanate or ferrite.

BRIEF DESCRIPTION OF THE DRAWING

FIG. 1 shows the steps of a method of our invention.

FIG. 2 shows a highly enlarged section of particles of powder made to our invention.

FIG. 3 shows a section of wire made to our invention.

DESCRIPTION OF A PREFERRED EMBODIMENT

In FIG. 1 the steps of our method are symbolically illustrated where a ball mill 11 represents the final step of grinding a barium titanate or other inorganic high-dielectric-constant substance such as a ferrite. The particle size of a powder 12 removed from the mill 11 is exceedingly fine preferably averaging about 0.03 mils in diameter. It will be understood that, while we have shown a dry powder 12 being removed from the mill 11 our method does not exclude the possibility of a wet grind of known type as the final grinding step for the powder 12 in which case there will most probably be a drying step, which has not been shown but which is conventional, on leaving the mill 11.

The powder 12 is shown being blended into a vat 13 of molten epoxy resin 14. In an example to be given hereinbelow, we have employed Epi-Rez 540 C, an epoxy supplied by the Celanese Plastics Company, which has a viscosity of about 2000-3000 poises in the heated, molten state so that a uniform dispersion of the powder 12 in the resin can be achieved with conventional equipment. Our process however has application to higher molecular weight epoxy resins with correspondingly higher viscosities, polyolefins, polyesters, polyacrylics, polyvinyls, polyamids, polyimids and others, and other known methods of dispersing the powder into the resin may be used within the scope of our invention. Such methods will include the introduction of the powder 12 into the resin before it is fully polymerized and has not reached its final viscosity, the addition of a solvent or thinning agent which is removed or combined after the powder has been dispersed, and the use of a rubber compounding mill to work in the powder while the resin is in a plastic state. In any event the resin 14 is then cooled, which may be accomplished by pouring it into a mold 16 whence it is comminuted by a mill such as a hammer mill 17 to form granulations 18 which are finally reduced to a powder 19 by an attrition or other mill 21 in a known manner. The size of the particles 19, while considered fine by most standards is still much coarser than the particles 12 being about 2 mils in diameter on the average. When it is considered that the diameter of the coating particles 19 are about 67 times the diameter of the inorganic particles 12, a given volume will be seen to have $67^3$ or 300,000 times as many of the inorganic particles. If only 1 percent by volume of the powder 12 is added to the melt 14 each of particles 22 (FIG. 3) of the powder 19 will, on the average, contain about 3,000 of particles 23 of the powder 12 and an appreciable number of these high-dielectric-constant particles will be exposed at the surfaces of the particles 22. The powder 19 is finally deposited on a wire 24 in an electrostatic chamber 26 in a known manner such as that described in Pat. No. 3,396,699 whence it is fused in a known manner by passing the wire through an oven, not shown, of known construction. In the apparatus 26 the particles 19 are electrostatically charged by a high-voltage electrode 27 and we have found, as shall be shown, that heavier walls 28 (FIG. 3) can be deposited as a result of the addition of the particles 12 of material with a dielectric constant of 1500 or more.

EXAMPLE 1

An enameling powder for electrostatic deposition was prepared by dispersing 1.48 percent by weight of extra-fine barium titanate powder with a dielectric constant of approximately 1740 in Epi Rez 540 C, cooling, comminuting and grinding to the following sieve analysis:

|  | % retained |
|---|---|
| on 170 mesh | 27.8 |
| on 200 mesh | 34.0 |
| on 230 mesh | 23.4 |
| on 270 mesh | 9.6 |
| on 325 mesh | 3.6 |
| on 400 mesh | 1.2 |

EXAMPLE 2

An enameling powder for electrostatic deposition was prepared by dispersing 1.69 percent by weight of extra fine Ferramic-C, a ferrite with a dielectric constant of approximately 110,000 supplied by General Ceramics Corp. of Keasbey, N.J. and described in Pat. No. 2,981,689, in Epi Rez 540 C, cooling comminuting and grinding to the following sieve analysis:

|  | % retained |
| --- | --- |
| on 170 mesh | 40.9 |
| on 200 mesh | 32.6 |
| on 230 mesh | 18.6 |
| on 270 mesh | 6.2 |
| on 325 mesh | 1.7 |
| on 400 mesh | 0.0 |

EXAMPLE 3

An enameling powder with the same composition as example 2 except for the substitution of Ferramic-H, a ferrite with a dielectric constant of approximately 680,000 described in Pat. Nos. 2,670,331 and 2,773,039, was prepared with the following sieve analysis:

|  | % retained |
| --- | --- |
| on 170 mesh | 19.6 |
| on 200 mesh | 46.1 |
| on 230 mesh | 19.0 |
| on 270 mesh | 11.6 |
| on 325 mesh | 3.3 |
| on 400 mesh | 1.4 |

EXAMPLE 4

A control of Epi Rez 540 C was prepared with the following screen analysis:

|  | % retained |
| --- | --- |
| on 170 mesh | 14.6 |
| on 200 mesh | 23.0 |
| on 230 mesh | 28.8 |
| on 270 | 23.9 |
| on 325 mesh | 7.3 |
| on 400 mesh | 1.2 |

In the electrostatic deposition of enamel powder, a choice is presented of the voltage to apply to the electrode 27 and in the table below there is reported the thickness of coating deposited on the flats and edges of a flat aluminum wire 0.064 x 0.121 inches coated at a speed of 40 feet per minute. Similar results can confidently be expected for deposition on other metals such as copper, steel, and alloys thereof and other shapes and contours.

TABLE.—THICKNESS OF POWDER DEPOSIT, MILS

| Electrode voltage, KV. | Example | | | | | | | |
| --- | --- | --- | --- | --- | --- | --- | --- | --- |
|  | 1 | | 2 | | 3 | | 4 | |
|  | Flats | Edges | Flats | Edges | Flats | Edges | Flats | Edges |
| 30 | 2.6 | 3.3 | 3.0 | 3.3 | 3.0 | 2.9 | 0.7 | 0.6 |
| 35 | 1.8 | 2.4 | 2.8 | 2.9 | 2.7 | 3.0 | 1.2 | 1.0 |
| 40 | 2.0 | 2.4 | 3.2 | 4.2 | 3.5 | 3.8 | 1.5 | 1.2 |
| 45 | 2.2 | 2.8 | 4.1 | 4.3 | 4.1 | 5.2 | 1.8 | 1.6 |
| 50 | 2.7 | 2.2 | 5.4 | 5.9 | 4.6 | 5.4 | 2.0 | 2.0 |
| 55 | 3.0 | 3.9 | 5.4 | 6.5 | 5.2 | 6.2 | 2.6 | 3.2 |
| 60 | 3.5 | 3.1 | 5.5 | 6.7 | 5.3 | 6.8 | 4.1 | 4.6 |
| 65 | 4.5 | 3.6 | 8.2 | 10.0 | 5.9 | 7.7 | 5.0 | 5.4 |
| 70 | 4.7 | 5.0 | 8.7 | 10.8 | 7.3 | 9.7 | 6.4 | 6.2 |

From the table it can be seen that the powder containing barium titanate (example 1) resulted in a heavier deposit on both flats and edges than the powder of the control (example 4) up to an applied voltage of 55 kv. and that the powders with ferrite particles resulted in heavier deposits at all voltages. Since the speed of deposit and the total thickness deposited has great commercial importance in the coating of many products and in xerography the utility of our present invention is apparent of which the foregoing description has been exemplary rather than definitive and for which we desire an award of Letters Patent as defined in the following claims.

We claim:
1. An electrically insulated article comprising:
   A. a metallic conductor, and
   B. a layer of insulation coating said conductor,
      a. said insulation comprising the fusion of a large plurality of compound particles electrostatically deposited on said conductor,
      b. each of said particles comprising a polymeric resin and a plurality of finer particles of inorganic substance of dielectric constant no less than 1,500, the weight of said inorganic substance comprising no more than a small percentage of the weight of said coating.
2. The article of claim 1 wherein said inorganic substance comprises barium titanate.
3. The article of claim 1 wherein said inorganic substance comprises a ferrite.
4. The article of claim 1 wherein said polymeric resin comprises an epoxy resin.

* * * * *